United States Patent [19]

Nagai et al.

[11] Patent Number: 4,585,568

[45] Date of Patent: Apr. 29, 1986

[54] PLATE-LIKE BARIUM FERRITE PARTICLES FOR MAGNETIC RECORDING AND PROCESS FOR PRODUCING THE SAME

[75] Inventors: Norimichi Nagai; Nanao Horiishi, both of Hiroshima; Masao Kiyama; Toshio Takada, both of Kyoto, all of Japan

[73] Assignee: Toda Kogyo Corp., Hiroshima, Japan

[21] Appl. No.: 589,350

[22] Filed: Mar. 14, 1984

[30] Foreign Application Priority Data

Mar. 26, 1983 [JP] Japan ................................. 58-50800

[51] Int. Cl.$^4$ .............................................. C04B 35/26
[52] U.S. Cl. .............................. 252/62.59; 252/62.56; 252/62.63
[58] Field of Search ............... 252/62.56, 62.59, 62.63; 423/594

[56] References Cited

U.S. PATENT DOCUMENTS 4,414,124 11/1983 Endo et al. ....................... 252/62.63

FOREIGN PATENT DOCUMENTS 56-155023 12/1981 Japan ................................. 423/594

*Primary Examiner*—Jack Cooper
*Attorney, Agent, or Firm*—Lyon & Lyon

[57] ABSTRACT

Disclosed herein are plate-like barium ferrite particles having BET specific surface area of 20 to 70 m$^2$/g and average particle diameter of 0.05 to 0.3 µm, and showing a magnetization of higher than 30 emu/g in a field of 10 kOe and coercive force of 300 to 1,000 Oe, represented by the formula BaCo$_x$Ti$_x$Fe$_{12-2x}$O$_{19}$ wherein x is 0.1 to 0.5, and a process for producing the same.

13 Claims, 6 Drawing Figures x in the formula: $BaCo_xTi_xFe_{12-2x}O_{19}$ (×40000)

(×100000)

(×20000)

PLATE-LIKE BARIUM FERRITE PARTICLES FOR MAGNETIC RECORDING AND PROCESS FOR PRODUCING THE SAME

BACKGROUND OF THE INVENTION

The present invention relates to fine particles obtained by substituting a part of Fe(III) in plate-like particles of barium ferrite with Co(II) and Ti(IV), for use in magnetic recording, and a process for producing the same.

More in detail, the present invention relates to plate-like barium ferrite particles for magnetic recording, having BET specific surface area of 20 to 70 m²/g and average particle diameter of 0.05 to 0.3 μm, and showing magnetization of larger than 30 emu/g in a magnetic field of 10 KOe and coercive force of 300 to 1,000 Oe, represented by the formula $BaCo_xTi_xFe_{12-2x}O_{19}$ wherein x is 0.1 to 0.5 and to a process for producing the plate-like barium ferrite particles represented by the formula:

$$BaCo_xTi_xFe_{12-2x}O_{19}$$

wherein x is 0.1 to 0.5 which comprises autoclaving an aqueous highly alkaline suspension containing Fe(III), Co(II), Ti(IV) and Ba ions at a temperature of 250° to 320° C., the atomic ratio of total amount of Co(II) and Ti(IV) to the amount of Fe(III) being 0.017:1 to 0.09:1, the amount of Co(II) being the same as that of Ti(IV) and the atomic ratio of Ba ions to the total sum of Fe(III), Co(II) and Ti(IV) being 1:7 to 1:9.

In recent years, accompanying with the propagation of VTR, audio component, word processer and computer, non-acicular ferromagnetic particles of a favorable dispersibility provided with a suitable coercive force(Hc) have been required as the magnetic material for recording, particularly as the magnetic material for the perpendicular magnetic recording.

In general, as the ferromagnetic non-acicular particles, barium ferrite particles have been well known. However, the coercive force of barium ferrite particles obtained by the dry method is ordinarily larger than 3,000 Oe, and because of such a high coercive force, barium ferrite particles are not favorable as a magnetic material for magnetic recording.

Further, the conventional barium ferrite particles obtained by sintering are composed of polycrystals of an average diameter of a few micrometers, and even after pulverizing thereof, the average diameter of the thus pulverized particles is around one micrometer. Accordingly, such barium ferrite particles are poor in dispersibility in paints and is not favorable as a magnetic material for magnetic recording.

Namely, as a magnetic material for magnetic recording, those which are as fine as possible, particularly those of an average particle diameter of 0.05 to 0.3 μm have been demanded. For instance, Japanese Patent Application Laying Open No. 53-20596 (1978) discloses that there is a difficulty in uniformly dispersing the particles of diameter over 0.5 μm. Japanese Patent Application Laying Open No. 56-125219 (1981) discloses as follows. "In the range of recording wavelength of shorter than 1 μm, perpendicular magnetic recording is more useful as compared to longitudinal magnetic recording, and in order to effect the sufficient recording and regeneration in the above-mentioned wavelength region, the particle diameter of ferrite is favorably less than about 0.3 μm. Since the particles of about 0.01 μm in diameter do not show the desired ferromagnetism, as an preferable diameter of particle, the range of 0.01 to 0.3 μm is demanded." Japanese Patent Application Laying Open No. 57-212623 (1982) discloses that the average particle diameter of magnetic barium ferrite particle is favorably below 0.3 μm, and particularly, those fine particles of average particle diameter of 0.03 to 0.3 μm are favorably preferable, because the particles of the particle diameter of below 0.03 μm do not exhibit the sufficient ferromagnetic property necessary for magnetic recording, and on the other hand, the particles of the average particle diameter of over 0.3 μm cannot advantageously carry out the magnetic recording as the high density recording.

Further, it is necessary that the value of magnetization of the magnetic particles is as large as possible, and its necessity is clearly seen in the description in Japanese Patent Application Laying Open No. 56-149328 (1981) that it is required that the saturation magnetization of magnetoplumbite-ferrite used as a material for the medium of magnetic recording is as large as possible.

On the other hand, as a method for producing barium ferrite particles, a method of treating an aqueous alkaline suspension containing Ba-ions and Fe(III) in an autoclave as a reactor (the method is hereinafter referred to as "the autoclaving method") has been hitherto known, and by selecting the reaction conditions in the autoclaving method, barium ferrite particles precipitate. The thus precipitated particles are hexagonal plate-like particles, and the distribution of the particle size and the average size of the particles differ according to the reaction conditions resulting in the difference of the magnetic properties of the particles. In the technical field of producing plate-like barrium ferrite particles for use in magnetic recording, not only the method of forming the product from an aqueous solution but also the method for forming the product from a fluid has been hitherto tried. On the other hand, a technique by which non-ferromagnetic barium ferrite particles are formed from an aqueous solution according to the autoclaving method and the thus obtained non-ferromagnetic barium ferrite particles are sintered at a high temperature to obtain ferromagnetic barium ferrite particles has been tried.

Further, as is seen in Japanese Patent Application Laying Open No. 56-149328 (1981), in order to reduce the coercive force of the barium ferrite particles, it is proposed that a part of Fe(III) in the ferrite is substituted by Co(II) and Ti(IV). In this case, as is clearly seen in Example of Japanese Patent Application Laying Open No. 56-149328 (1981), unless the large amount of Co(II) and Ti(IV) is added so that in the formula $BaCo_xTi_xFe_{12-2x}O_{19}$, becomes larger than 0.8, the coercive force cannot be reduced to the extent which is appropriate as the magnetic material for magnetic recording. However, such a large amount of Co(II) and Ti(IV) causes the reduction of the purity of the thus formed barium ferrite particles resulting in a large reduction of the magnetization although the effect of reducing the coersive force is larger. The above-mentioned fact is clearly seen in Comparative Example 1 of Japanese Patent Application Laying Open No. 56-149328 (1981) wherein the extent of saturation magnetization is as small as 26 emu/g.

The present inventors, in order to reduce the coercive force effectively without remarkably reducing the magnetization by adding Co(II) and Ti(IV) in an amount of as small as possible, have repeated the systematic investigation on the relationship between the conditions in formation of barium ferrite particles from an aqueous solution and the average particle diameter, the particle size distribution and the magnetic properties of the thus formed barium ferrite particles.

As a result of the present inventors' study, it has been found that in the case where an aqueous strongly alkaline suspension containing Fe(III), Co(II), Ti(IV) and Ba ions is autoclaved at a temperature in the range from 250° to 320° C., wherein the total amount of Co(II) and Ti(IV) is 0.017 to 0.09 to one atomic amount of Fe(III), the amount of Co(II) is the same as that of Ti(IV) and the atomic ratio of Ba ions to the sum of Fe(III), Co(II) and Ti(IV) ions is 1:7 to 1:9, fine plate-like particles represented by the formula, $BaCo_xTi_xFe_{12-2x}O_{19}$ wherein $0.1 \leq X \leq 0.5$, having the properties of 20 to 70 $m^2/g$ of BET specific surface area and 0.05 to 0.3 $\mu m$ of average particle diameter, and showing more than 30 emu/g of value of magnetization in a magnetic field of 10 kOe and 300 to 1,000 Oe of coercive force are formed, and based on the finding, the present invention has been attained.

SUMMARY OF THE INVENTION

In the first aspect of the present invention, there is provided the plate-like barium ferrite particles for magnetic recording, represented by the formula, $BaCo_xTi_xFe_{12-2x}O_{19}$ wherein $0.1 \leq X \leq 0.5$, having BET specific surface area of 20 to 70 $m^2/g$ and average particle diameter of 0.05 to 0.3 $\mu m$, and showing value of magnetization of larger than 30 emu/g in a magnetic field of 10 kOe and coercive force of 300 to 1,000 Oe.

In the second aspect of the present invention, there is provided a process for producing the plate-like barium ferrite particles for magnetic recording, represented by the formula, $BaCo_xTi_x Fe_{12-2x}O_{19}$ wherein x is 0.1 to 0.5, which comprises autoclaving an aqueous highly alkaline suspension containing Fe(III), Co(II), Ti(IV) and Ba ions at a temperature of 250° to 320° C., the atomic ratio of total amount of Co(II) and Ti(IV) to the amount of Fe(III) being 0.017:1 to 0.09:1, the amount of Co(II) being the same as that of Ti(IV) and the atomic ratio of Ba ions to the total sum of Fe(III), Co(II) and Ti(IV) being 1:7 to 1:9.

In the third aspect of the present invention, there is provided the plate-like barium ferrite particles represented by the formula, $BaCo_xTi_xFe_{12-2x}O_{19}$ wherein x is 0.1 to 0.5, having BET specific surface area of 20 to 70 $m^2/g$ and average particle diameter of 0.05 to 0.3 $\mu m$, and showing magnetization of larger than 30 emu/g in a magnetic field of 10 kOe and coercive force of 300 to 1,000 Oe, produced by autoclaving an aqueous highly alkaline suspension containing Fe(III), Co(II), Ti(IV) and Ba ions at a temperature of 250° to 320° C., the atomic ratio of total amount of Co(II) and Ti(IV) to the amount of Fe(III) being 0.017:1 to 0.09:1, the amount of Co(II) being the same as that of Ti(IV) and the atomic ratio of Ba ions to the total sum of Fe(III), Co(II) and Ti(IV) being 1:7 to 1:9.

BRIEF EXPLANATION OF DRAWINGS

Of the attached drawing, FIGS. 1 to 3 respectively show the diagrams obtained by plotting the values of magnetization(M), coercive force(Hc) and specific surface area(S) of the barium ferrite particles represented by the formula, $BaCo_xTi_xFe_{12-2x}O_{19}$ which is formed according to the present invention against x which shows the composition of the barium ferrite.

DETAILED DESCRIPTION OF THE INVENTION

In order to obtain the barium ferrite particles of an effectively reduced coercive force with the addition of Co(II) and Ti(IV) in an amount as small as possible without remarkable reduction of magnetization, the present inventors have prepared various kinds of plate-like barium ferrite particles represented by the formula, $BaCo_xTi_xFe_{12-2x}O_{19}$ while changing the conditions in formation thereof such as the ratio of Co(II) and Ti(IV) to Fe(III), the ratio of Ba ion to Fe(III), Co(II) and Ti(IV), the concentration of alkali in the aqueous alkaline solution, the temperature and time of the reaction and the conditions of agitation of the aqueous suspension.

As a result of the study, the present inventors have found that in the case where an aqueous strongly alkaline suspension containing Fe(III), Co(II), Ti(IV) and Ba ions wherein the total atomic ratio of Co(II) and Ti(IV) to Fe(III) is 0.017 to 0.09, the amount of Co(II) is the same as that of Ti(IV) and the atomic ratio of Ba ion to the sum of Fe(III), Co(II) and Ti(IV) is 1:7 to 1:9 is autoclaved at a temperature of 250° to 320° C., it is possible to obtain from the aqueous suspension the fine plate-like barium ferrite particles represented by the formula, $BaCo_xTi_xFe_{12-2x}O_{19}$ wherein $0.1 \leq X \leq 0.5$ having BET specific surface area of 20 to 70 $m^2/g$ and average particle diameter of 0.05 to 0.3 $\mu m$, and showing magnetization of larger than 30 emu/g in a magnetic field of 10 kOe and coercive force of 300 to 1,000 Oe and that there is a close relationship among the composition of the thus obtained fine plate-like barium ferrite particles represented by the above-mentioned formula and the shape, the size, the properties such as the coercive force (Hc) and the magnetization (M).

The following is the explanation of the representative examples of the numerous experiments carried out by the present inventors.

Figure 1:
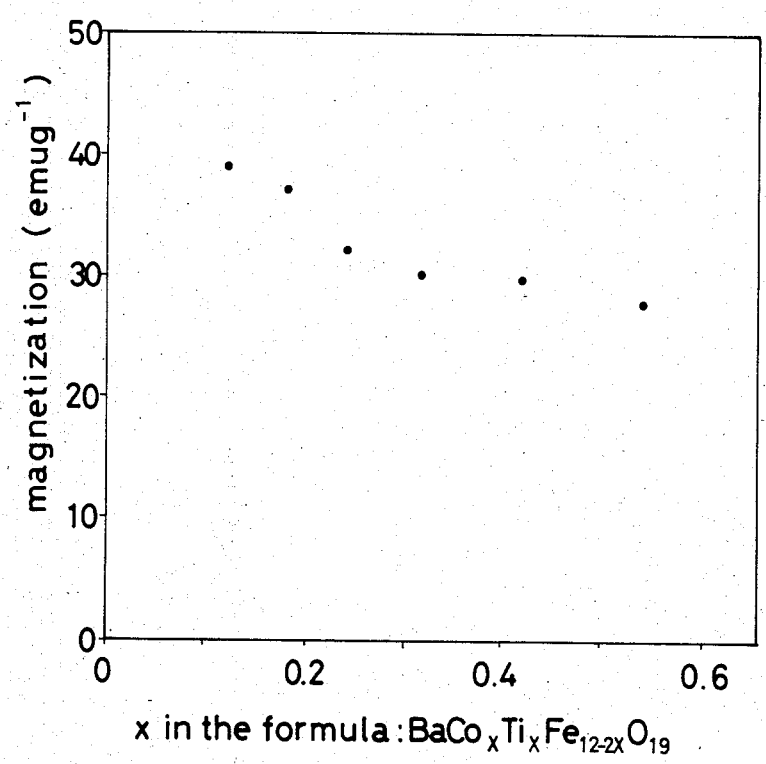
Figure 2:
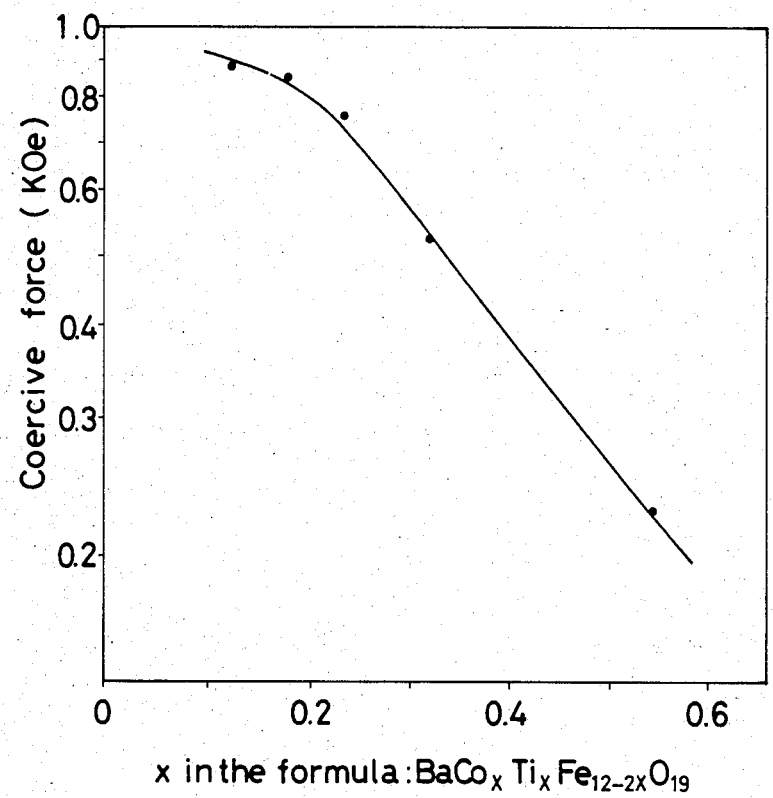
Figure 3:
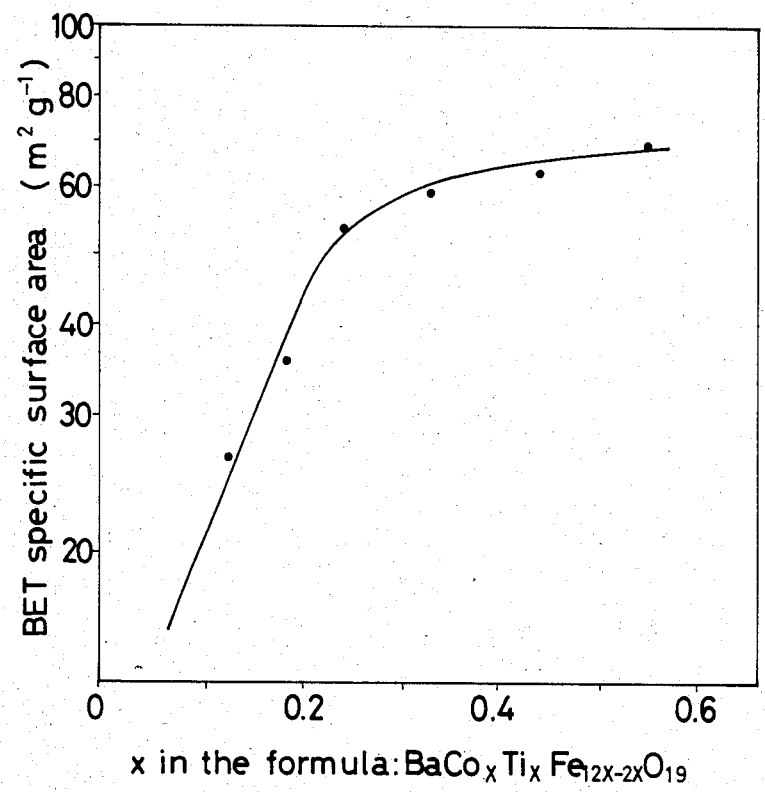

FIGS. 1 to 3 respectively show the diagrams obtained by plotting the magnetization (M), the coercive force (Hc) and the specific surface area (S) of the thus formed fine plate-like barium ferrite particles of an average particle diameter of 0.1 $\mu m$ and of a degree of packing of 1.6 $g/cm^3$ against x which represents the composition of the barium ferrite when the platelike particles are magnetized at 10 kOe.

As is clearly seen in FIG. 1, there is a tendency of the slight reduction of the magnetization (M) with the increase of the value of x, and as are clearly seen in FIGS. 2 and 3, there are the tendencies of increase of BET specific surface area (S) and of reduction of the coercive force (Hc) with the increase of the value of x. Accordingly, the coercive force (Hc) can be controlled at a value of less than 1,000 Oe mainly by changing x which represents the composition of barium ferrite As a result, the plate-like barium ferrite particles of the formula $BaCo_xTi_xFe_{12-2x}O_{19}$ wherein $0.1 \leq x \leq 0.5$, having BET specific surface area of 20 to 70 m²/g according to the present invention show a small value of coercive force.

The conditions in the production of the plate-like barium ferrite particles are described as follows.

As Fe(III) in the present invention, ferric chloride, ferric nitrate and powdery ferric oxyhydroxide may be used.

As Ba ion in the present invention, barium hydroxide and barium oxide may be used.

As Co(II) in the present invention, cobalt nitrate and cobalt chloride may be used, and as Ti(IV) in the present invention, titanium chloride and alkali titanate may be used.

The autoclaving treatment of the present invention may be carried out at any temperature which is lower than the critical temperature of the aqueous solution, and particularly the reaction temperature of 250° to 320° C. is suitable for an economic production of the ferrite.

The atomic ratio of the total amount of Co(II) and Ti(IV) to the amount of Fe(III) in the present invention is 0.017 to 0.09, preferably 0.024 to 0.057. In the case where the atomic ratio is below 0.017 or in the case where the atomic ratio is over 0.09, it is unable to obtain barium ferrite particles represented by the formula, $BaCo_xTi_xFe_{12-2x}O_{19}$ wherein $0.1 \leq x \leq 0.5$.

The atomic ratio of Ba ions to the total amount of Fe(III), Co(II) and Ti(IV) is 1:7 to 1:9. When the pH becomes higher, reaction temperature becomes higher or the feed ratio of Co(II) and Ti(IV) to Fe(III) becomes larger, the atomic ratio of Ba ions to the total amount of Fe(III), Co(II) and Ti(IV) becomes up to 1:9.

The plate-like barium ferrite particles produced by the procedures according to the present invention exhibit the following properties.

Namely, according to the process of the present invention, the plate-like barium ferrite particles of the formula, $BaCo_xTi_xFe_{12-2x}O_{19}$ wherein $0.1 \leq x \leq 0.5$ which are favorable in dispersibility and show BET specific surface area of 20 to 70 m²/g, preferably 45 to 65 m²/g, average particle diameter of 0.05 to 0.3 μm, preferably 0.05 to 0.25 μm magnetization of larger than 30 emu/g in a magnetic field of 10 kOe. And coercive force of 300 to 1,000 Oe, preferably 400 to 800 Oe are obtained, and such plate-like barium ferrite particles are suitable as the magnetic material for magnetic recording now being demanded, particularly as the magnetic material for perpendicular magnetic recording.

The present invention will be explained more in detail while referring to the following non-limitative Examples and Comparative Examples.

Further, the value of specific surface area means that the value is obtained by the BET method, the value of magnetization is measured in the magnetic field of 10 KOe, and the coercive force is measured at a packing density of 1.6 g/cm³.

EXAMPLE 1

Into 20 liters of decarbonized water in an autoclave, 14 mol of $Fe(NO_3)_3$, each 0.179 mol of $Co(NO_3)_2$ and $TiCl_4$, 1.76 mol of $Ba(OH)_2.8H_2O$ and 162 mol of NaOH were added, and the mixture was heated to 270° C. Thereafter, the mixture was kept at the temperature for 5 hours under mechanical agitation to form a ferromagnetic precipitate of brown in colour.

Figure 4:
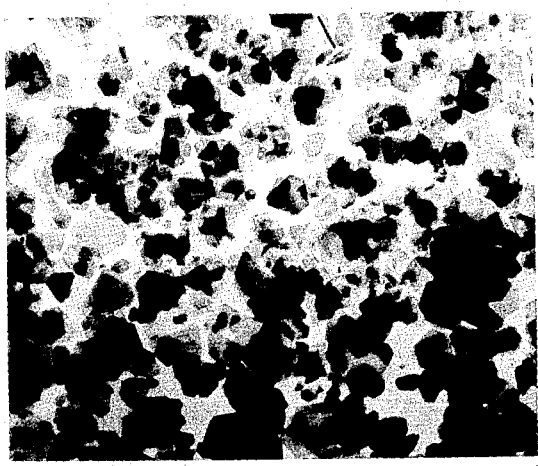
FIG. 4 is an electronmicrograph ($\times 40,000$) of the barium ferrite particles of $x=0.15$ obtained in Example 1.

After cooling the content of the autoclave to room temperature, the ferromagnetic brown precipitate was collected by filtration, washed with water and dried at 80° C. The thus obtained ferromagnetic brown particles were identified as $BaCo_{0.15}Ti_{0.15}Fe_{11.7}O_{19}$ as a result of fluorescent X-ray analysis. FIG. 4 shows the electronmicrograph ($\times 40,000$) of the thus obtained particles, and as is seen in FIG. 4, the product was hexagonal plate-like particles having specific surface area of 28 m²/g, uniform in particle size and the particle diameter of 0.1 to 0.2 μm. According to vibrating sample magnetometer, magnetization was 38 emu/g in a field of 10 kOe and the coercive force of the product was 850 Oe at a packing density of 1.6 g/cm³.

EXAMPLE 2

Into 20 liters of decarbonized water in an autoclave, 14 mol of $Fe(NO_3)_3$, each 0.499 mol of $TiCl_4$ and $Co(NO_3)_2$, 1.75 mol of $Ba(OH).8H_2O$ and 167 mol of NaOH were added, and after heating the mixture to 300° C., the content of the autoclave was kept at the same temperature for 3 hours while mechanically agitating the mixture to obtain a ferromagnetic precipitate brown in colour.

Figure 5:
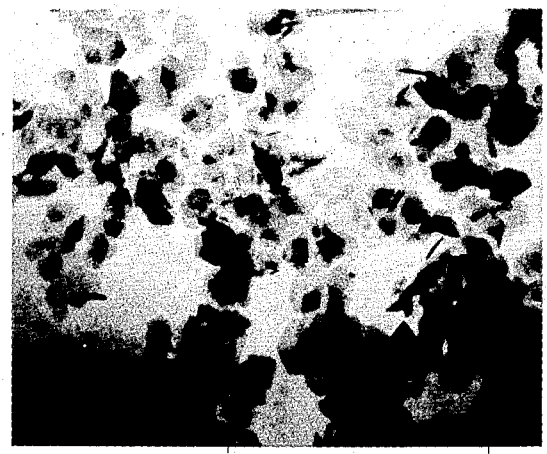
FIG. 5 is an electronmicrograph ($\times 100,000$) of the barium ferrite particles of $x=0.40$ obtained in Example 2

By treating the product of the reaction in the same procedures as in Example 1, ferromagnetic brown particles was obtained, and identified as $BaCo_{0.40}Ti_{0.40}Fe_{11.20}O_{19}$ as a result of fluorescent X-ray analysis. The specific surface area (S) of the thus obtained particles was 58 m²/g. FIG. 5 is the electronmicrograph ($\times 100,000$).

As are clearly seen in FIG. 5, the product of Example 2 was hexagonal plate-like particles of uniform in particle size, having the particle diameter of 0.05 to 0.1 μm. The magnetization of the product was 32 emu/g in a magnetic field of 10 kOe and the coercive force (Hc) was 415 Oe at a packing density of 1.6 g/cm³.

Further, in barium ferrite, the direction of C axis is the direction of easy magnetization, and also the thus obtained fine plate-like particles of $BaCo_xTi_xFe_{12-2x}O_{19}$ according to the present invention are easily orientable by pressing, thereby the value of coercive force (Hc) becomes larger.

COMPARATIVE EXAMPLE 1

Figure 6:
FIG. 6 is an electronmicrograph ($\times 20,000$) of the barium ferrite particles obtained in Comparative Example 1

In the same procedures as in Example 1 except for using Co(II) and Ti(IV), ferromagnetic brown particles were obtained, which showed the specific surface area (S) of 6.5 m²/g. FIG. 6 is an electronmicrograph of the product ($\times 20,000$). As are clearly seen in FIG. 6, the product was composed of hexagonal plate-like particles of the particle diameter of 1.0 μm. The product showed the magnetization (M) of 49.6 emu/g in a magnetic field of 10 kOe and the coercive force of 1,250 Oe at a packing density of 1.6 g/cm³.

COMPARATIVE EXAMPLE 2

In the same procedures as in Example 1 except for using each 0.999 mol of Co(II) and Ti(IV), a ferromagnetic brown precipitate was obtained. The ferromagnetic brown particles obtained from the precipitate was identified as $BaCo_{0.75}Ti_{0.75}Fe_9O_{19}$ as a result of fluorescent X-ray analysis. The value of magnetization (M) was 15 emu/g in a magnetic field of 10 kOe.

What is claimed is:

1. Plate-like barium ferrite particles represented by the formula $BaCo_xTi_xFe_{12-2x}O_{19}$ wherein x is 0.1 to 0.5, having a BET specific surface area of 20 to 70 m²/g and an average particle diameter of 0.05 to 0.3 μm, and showing a magnetization of larger than 30 emu/g in a magnetic field of 10 kOe and a coercive force of 300 to 1,000 Oe.

2. Plate-like barium ferrite particles according to claim 1, wherein BET specific surface area thereof is in the range of 45 to 65 m$^2$/g.

3. Plate-like barium ferrite particles according to claim 1, wherein said average particle diameter is in the range of 0.05 to 0.25 μm.

4. Plate-like barium ferrite particles according to claim 1, wherein said coercive force is in the range of 400 to 800 Oe.

5. Process for producing plate-like barium ferrite particles represented by the formula:

$$BaCo_xTi_xFe_{12-2x}O_{19}$$

wherein x is 0.1 to 0.5, having a BET specific surface area of 20 to 70 m$^2$/g and an average particle diameter of 0.05 to 0.3 μm, and showing a magnetization of larger than 30 emu/g in the magnetic field of 10 KOe and a coercive force of 300 to 1,000 Oe, which comprises autoclaving an aqueous highly alkaline suspension containing Fe(III), Co(II), Ti(IV) and Ba ions at a temperature of 250° to 320° C., the atomic ratio of total amount of Co(II) and Ti(IV) to the amount of Fe(III) being 0.017:1 to 0.09:1, the amount of Co(II) being the same as that of Ti(IV) and the atomic ratio of Ba ions to the total sum of Fe(III), Co(II) and Ti(IV) being 1:7 to 1:9.

6. A process according to claim 5, wherein the source of Fe(III) is ferric chloride, ferric nitrate or powdery ferric oxyhydroxide.

7. A process according to claim 5, wherein the source of Ba ions is barium hydroxide or barium oxide.

8. A process according to claim 5, wherein the source of Co(II) is cobalt nitrate or cobalt chloride.

9. A process according to claim 5, wherein the source of Ti(IV) is titanium chloride or alkali titanate.

10. Plate-like barium ferrite particles for magnetic recording, represented by the formula $BaCo_xTi_xFe_{12-2x}O_{19}$ wherein x is 0.1 to 0.5, having BET specific surface area of 20 to 70 m$^2$/g and average particle diameter of 0.05 to 0.3 μm, and showing magnetization of larger than 30 emu/g in the magnetic field of 10 KOe and coercive force of 300 to 1,000 Oe, produced by autoclaving an aqueous highly alkaline suspension containing Fe(III), Co(II), Ti(IV) and Ba ions at a temperature of 250° to 320° C., the atomic ratio of total amount of Co(II) and Ti(IV) to the amount of Fe(III) being 0.017:1 to 0.09:1, the amount of Co(II) being the same as that of Ti(IV) and the atomic ratio of Ba ions to the total sum of Fe(III), Co(II) and Ti(IV) being 1:7 to 1:9.

11. Plate-like barium ferrite particles according to claim 10, wherein said BET specific surface area is in the range of 45 to 65 m$^2$/g.

12. Plate-like barium ferrite particles according to claim 10, wherein said average particle diameter is in the range of 0.05 to 0.25 μm.

13. Plate-like barium ferrite particles according to claim 10, wherein said coercive force is in the range of 400 to 800 Oe.

* * * * *